UNITED STATES PATENT OFFICE.

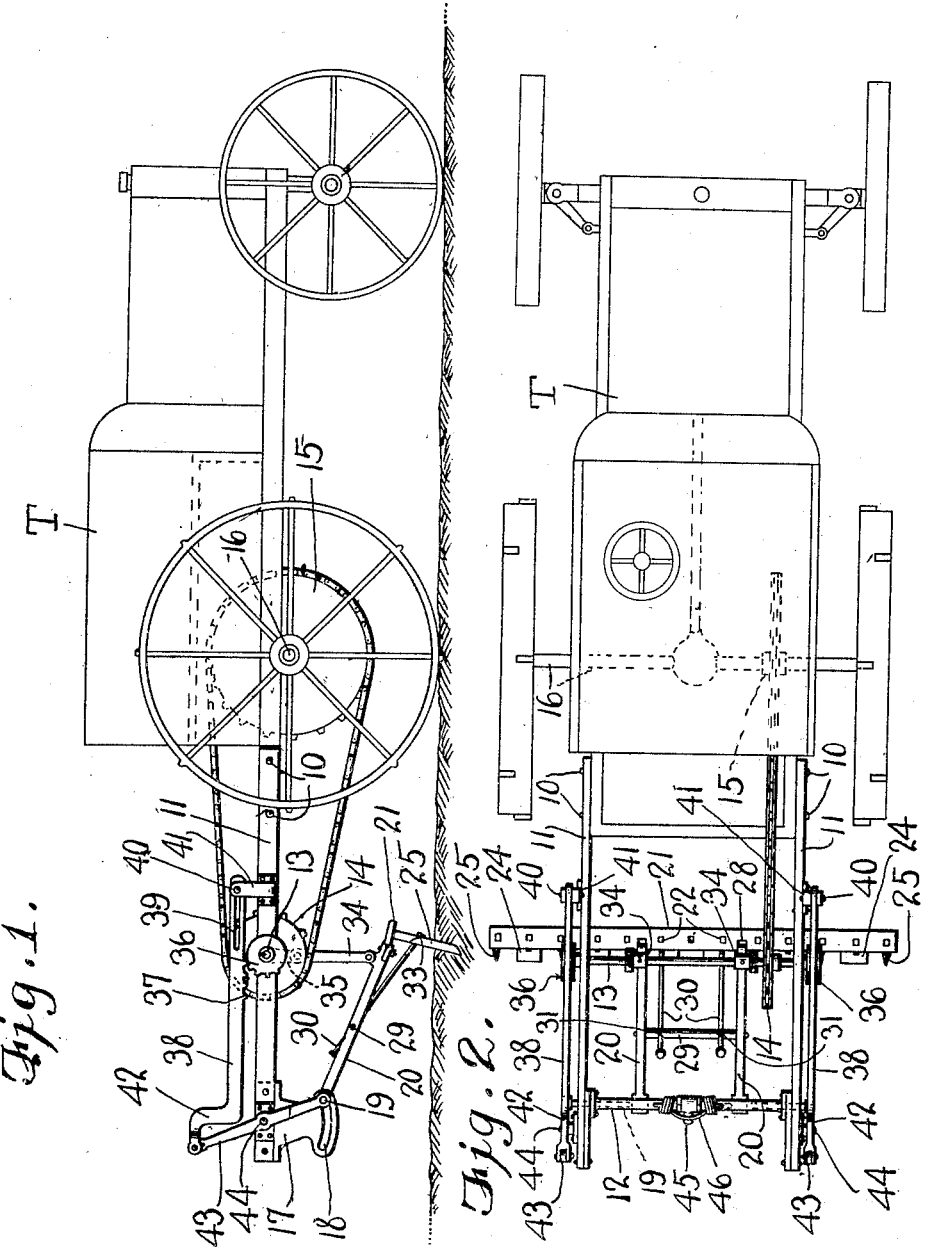

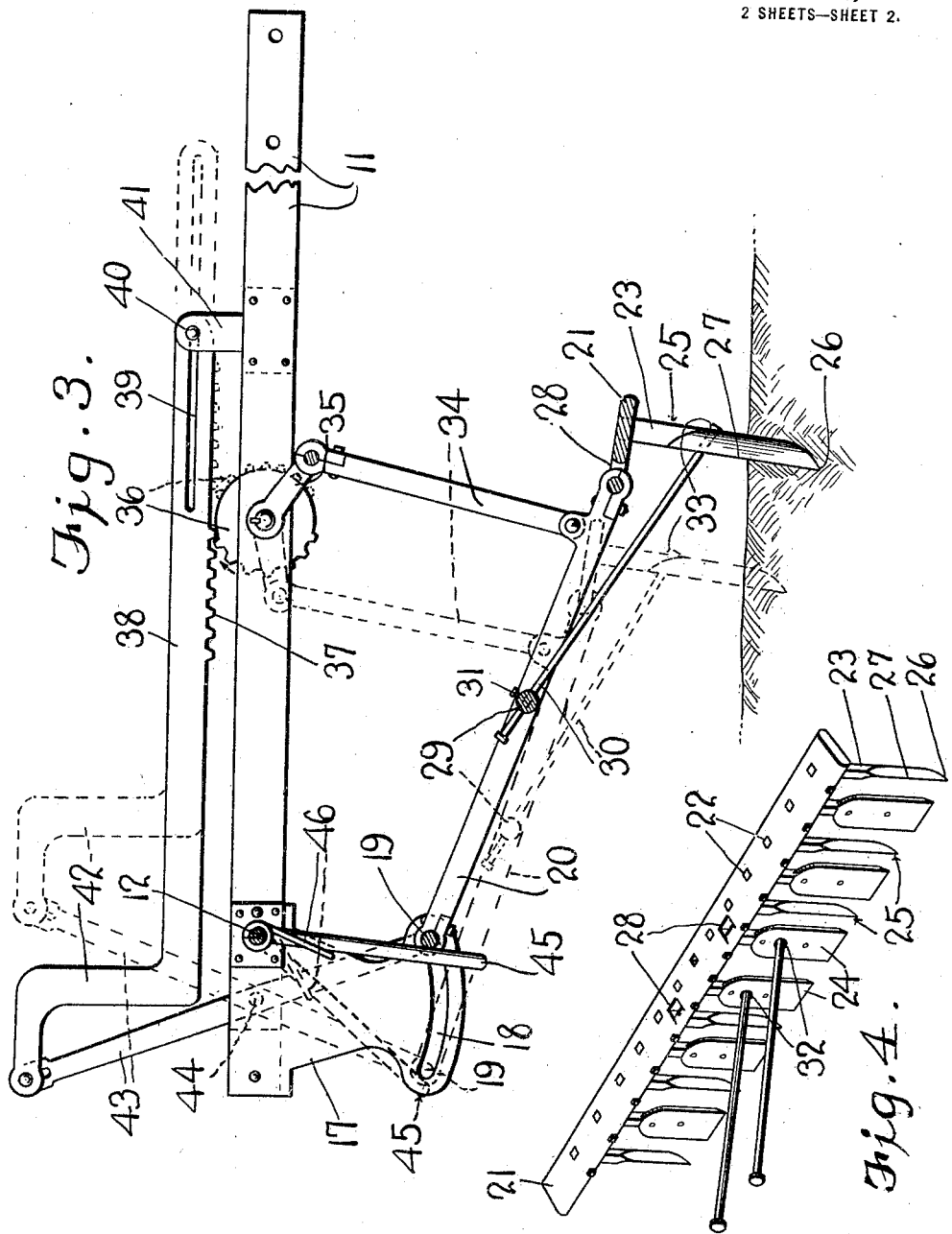

ROSARIO MAGISTRO, OF STAMFORD, CONNECTICUT.

SPADING-MACHINE.

1,368,177.  Specification of Letters Patent.  Patented Feb. 8, 1921.

Application filed June 6, 1919. Serial No. 302,300.

*To all whom it may concern:*

Be it known that I, ROSARIO MAGISTRO, a subject of the King of Italy, residing at Stamford, in the county of Fairfield and State of Connecticut, have invented new and useful Improvements in Spading-Machines, of which the following is a specification.

This invention relates to agricultural machines and aims to provide a machine for digging and breaking up the earth preparatory to planting, a primary object being to accomplish with one operation both the work of plowing and harrowing.

Another object of the invention is to provide a machine having blades or shovels, which will enter the ground at spaced intervals and be moved across the space between the last and the previous point of entry, so as to thoroughly break up and pulverize the ground the entire depth of penetration. This results in a better seed bed and the pulverized condition of the soil acts to retain moisture for an appreciable length of time.

Another object of the invention is to provide a machine of this character, which may be either a part of or attached to a suitable tractor, by means of which it is operated.

A further object is the provision of a machine which is simple and durable in construction, easy of operation and which may be manufactured at a moderate cost.

Other objects and advantages of the invention will appear as the following description is read in connection with the accompanying drawings.

In the drawings:

Figure 1 is a side elevation of the invention shown in position upon the rear end of a tractor.

Fig. 2 is a top plan view of the same.

Fig. 3 is an enlarged longitudinal sectional view of the invention *per se.*

Fig. 4 is a detail perspective view of the blades or shovels.

Referring to the drawings in detail, wherein like characters of reference denote corresponding parts, the invention is illustrated as secured to the rear end of a tractor T. This tractor may be of any suitable construction and the invention may be bolted to the rear end of a tractor frame, as indicated at 10. If desired, the invention may be included as a part of the structure of the tractor.

In carrying out the invention, there is provided a frame which includes spaced parallel side bars 11, which are connected adjacent one end by means of a bar 12, the opposite ends of the side bars 11 being connected to the frame of the tractor, as previously stated.

Mounted in suitable bearings in the side bars 11, is a crank shaft 13, which has secured thereon a sprocket wheel 14. This sprocket wheel is connected to a sprocket wheel 15 of relatively greater diameter, which is mounted upon a drive shaft 16 of the tractor frame.

Depending from the rear end of each of the side bars 11, is a bracket 17, the lower end of which is provided with a segmental guide slot 18. Operating within the slot 18 is a shaft 19, the latter having secured thereon a frame which carries the blades or shovels to be later described. This frame includes spaced parallel side bars 20, having one of their ends clamped upon the shaft 19. The opposite ends of the bars 20 are connected by a bar 21. This last mentioned bar is provided with spaced openings 22, for the reception of shanks 23, of blades or shovels 24 and 25. The blades or shovels 24 are of substantially flat formation and are provided with the usual penetrating edge at their lower ends, while the blades or shovels 25 are of knife-like formation and are provided with a penetrating point 26 and a cutting edge 27. By this means the blades or knives may be easily forced into the earth to the desired depth, the cutting edges 27 of the blades or shovels 25 acting to break or pulverize the soil to permit of this operation. The bar 21 is formed with spaced openings 28 to provide means for connection with the side bars 20. These last mentioned bars are also connected through the medium of a shaft or rod 29, which is provided with openings for the passage of adjusting rods 30. The rods 30 are held within the openings of the shaft 29 by means of set screws 31, one end of these rods passing through openings 32 provided in the blades or shovels 24, and being provided with a head 33. The purpose of the rods 30 is to adjust the blades or shovels 24 and 25 at the desired angle at the end of the frame.

Each of the side bars 20 has pivotally connected thereto one end of a connecting rod or link 34, the opposite end of this rod being connected to one of the cranks 35 of the crank shaft 13.

From the foregoing described construction, it will be apparent that a rotation of the crank shaft 13 will cause the blades or shovels 24 and 25 to be raised and lowered through the action of the connecting link 34, the frame carrying these blades or shovels being moved upon the pivot formed by the shaft 19. A downward movement of the cranks 34 will raise the blades or shovels to be forced into the earth upon a substantially vertical line after the manner of operation of hand spading.

It is also the purpose of the invention to move the blades or shovels rearwardly as the machine moves forward, the rearward movement being for a relatively short distance when the blades or shovels will be lifted and again moved forward and forced into the earth. To accomplish this, there is mounted at each end of the crank shaft 13, a mutilated gear 36, the teeth of which are adapted at spaced intervals to engage teeth 37 formed on rack bars 38, which are mounted for pivotal and sliding movement longitudinally of the side bars 11. To this end, the rack bars 38 are provided near one end with a slot 39, within which operates a pin 40 carried by the bifurcated end of a bracket 41, secured to each of the side bars 11. The opposite end of each of the rack bars 38 is provided with an upwardly and rearwardly extending angular arm 42, the extremity of which has pivotally connected thereto one end of a rocker arm 43. These rocker arms are pivotally mounted, as indicated at 44, upon the side bars 11 and have their lower ends pivotally connected to the shaft 19.

A rotation of the gears 36 will impart a longitudinal movement to the rack bars 38, so that they will be moved from the position shown in full lines in Fig. 3 to that shown by dotted lines in the same figure, carrying the blades or shovels 24 and 25 from the full line to the dotted line position. This is accomplished through the rocker arms 43 and their connection with the shaft 19. When the blades or shovels 24 and 25 reach the limit of their rearward movement, they are raised through the medium of the crank shaft previously described and are moved forward by means of an arm 45, which is carried by the connecting bar 12 and acts under the influence of a spring 46. When the limit of forward movement has been reached the shovels will be again forced into the earth through the action of the crank shaft 13. This forward and rearward movement of the blades or shovels is made possible by the ratio of gearing connecting the drive shaft 16 to the crank shaft 13.

The invention is susceptible of various changes in its form, proportions and minor details of construction and the right is herein reserved to make such changes as properly fall within the scope of the appended claims.

Having described the invention, what is claimed is:

1. The combination with a tractor, of a plurality of pivotally and adjustably mounted spaced blades and means operated by the tractor for imparting a downward and rearward movement to the blades during the forward movement of the tractor, said means including a tractor operated gear, a rack bar engageable with said gear, a sliding pivotal mounting for one end of the rack bar and a pivoted lever connected to the opposite end of said bar for lifting the latter from engagement with the gear during one movement of the rack bar.

2. The combination with a tractor, of a frame, a sliding pivotal mounting for said frame, spaced blades carried at one end of the frame, a crank shaft operated by the tractor, means connecting the crank shaft and the frame for imparting a vertical pivotal movement to said frame, means operated by the crank shaft for imparting a sliding movement to the frame when the latter is in lowered position and spring actuated means for sliding the frame in a reverse direction when the latter is in raised position.

3. The combination with a tractor, of a frame, a sliding pivotal mounting for said frame, spaced blades carried at one end of the frame, a crank shaft operated by the tractor, means connecting the crank shaft and the frame for imparting a vertical pivotal movement to said frame, means operated by the crank shaft for imparting a sliding movement to the frame when the latter is in lowered position, and means including a pivotally mounted spring actuated arm engageable with the frame for imparting a reverse sliding movement thereto when the latter is in raised position.

4. The combination with a tractor, of a frame, a sliding pivotal mounting for said frame, spaced blades carried at one end of the frame, a crank shaft operated by the tractor, means connecting the crank shaft with the frame for imparting a vertical pivotal movement to said frame, a mutilated gear mounted upon the crank shaft, a rack bar engageable with said gear and capable of horizontal sliding movement, means connecting the rack bar and frame for imparting a sliding movement to the latter when the frame is in lowered position and means for sliding the frame in an opposite direction when the latter is in raised position.

In testimony whereof I affix my signature.

ROSARIO MAGISTRO.